US010090872B2

(12) United States Patent
Uriguen et al.

(10) Patent No.: US 10,090,872 B2
(45) Date of Patent: Oct. 2, 2018

(54) METHOD AND APPARATUS FOR ESTIMATING A FREQUENCY DOMAIN REPRESENTATION OF A SIGNAL

(71) Applicants: Imperial Innovations Limited, London (GB); The Chinese University of Hong Kong, Hong Kong (CN)

(72) Inventors: Jose Antonio Uriguen, Bilbao (ES); Pier Luigi Dragotti, London (GB); Thierry Albert Jean-Louis Blu, Hong Kong (CN)

(73) Assignees: IMPERIAL INNOVATIONS LIMITED (GB); THE CHINESE UNIVERSITY OF HONG KONG (CN)

( * ) Notice: Subject to any disclaimer, the term of this patent is extended or adjusted under 35 U.S.C. 154(b) by 0 days.

(21) Appl. No.: 14/894,852

(22) PCT Filed: May 30, 2014

(86) PCT No.: PCT/GB2014/051671
§ 371 (c)(1),
(2) Date: Nov. 30, 2015

(87) PCT Pub. No.: WO2014/191771
PCT Pub. Date: Dec. 4, 2014

(65) Prior Publication Data
US 2016/0119007 A1    Apr. 28, 2016

(30) Foreign Application Priority Data

May 30, 2013    (GB) .................................. 1309689.6

(51) Int. Cl.
G06K 9/48    (2006.01)
H04B 1/16    (2006.01)
(Continued)

(52) U.S. Cl.
CPC ................ *H04B 1/16* (2013.01); *G06F 5/01* (2013.01); *G06F 17/14* (2013.01); *G06K 9/4604* (2013.01);
(Continued)

(58) Field of Classification Search
CPC .... G06F 5/01; G06K 9/46; G06T 3/40; G06T 5/50; G06T 7/00; H04B 1/16
See application file for complete search history.

(56) References Cited

U.S. PATENT DOCUMENTS

| | | | | |
|---|---|---|---|---|
| 3,914,588 A | * | 10/1975 | Nussbaumer | ...... H03H 17/0405 327/552 |
| 4,051,357 A | * | 9/1977 | Bonnerot | .............. G06F 17/142 708/405 |

(Continued)

FOREIGN PATENT DOCUMENTS

CN    1487267 A    4/2004

OTHER PUBLICATIONS

Baboulaz, L. et al.: "Exact Feature Extraction Using Finite Rate of Innovation Principles With an Application to Image Super-Resolution", IEEE Transactions on Image Processing, Piscataway, NJ, vol. 17, No. 2, (Feb. 2009), pp. 281-298.

(Continued)

*Primary Examiner* — Mekonen Bekele
(74) *Attorney, Agent, or Firm* — Tarolli, Sundheim, Covell & Tummino LLP (57) ABSTRACT

A signal processing method for estimating a frequency domain representation of signal from a series of samples distorted by an instrument function, the method comprising obtaining the series of samples; obtaining a set of coefficients that fit a set of basis functions to a complex exponential function wherein the set of basis functions comprises a plurality of basis functions each defined by a shifted
(Continued)

version of the instrument function in a signal domain; estimating the frequency domain representation of the signal based on the series of samples and the coefficients. This is wherein the estimate of the instrument function is based on a characterization of the instrument function in the frequency domain at frequencies associated with the complex exponential function.

18 Claims, 6 Drawing Sheets

(51) Int. Cl.
    *G06F 17/14*     (2006.01)
    *G06T 3/40*     (2006.01)
    *G06T 5/00*     (2006.01)
    *G06T 5/50*     (2006.01)
    *G06F 5/01*     (2006.01)
    *G06K 9/46*     (2006.01)
    *G06T 7/13*     (2017.01)

(52) U.S. Cl.
    CPC .......... *G06T 3/4053* (2013.01); *G06T 3/4084* (2013.01); *G06T 5/001* (2013.01); *G06T 5/50* (2013.01); *G06T 7/13* (2017.01); *G06F 2205/00* (2013.01); *G06T 2207/20048* (2013.01); *G06T 2207/20212* (2013.01)

(56) References Cited

U.S. PATENT DOCUMENTS

| | | | |
|---|---|---|---|
| 2003/0233204 A1 | 12/2003 | Peel, III et al. | |
| 2005/0147235 A1* | 7/2005 | Telukuntla | H04M 9/082 379/406.01 |
| 2006/0110072 A1* | 5/2006 | Domera-Venkata | G06T 5/50 382/299 |
| 2006/0262880 A1* | 11/2006 | Mizuta | H03F 1/3258 375/297 |
| 2007/0143078 A1* | 6/2007 | Vetterli | H03M 1/1285 702/189 |
| 2008/0249765 A1* | 10/2008 | Schuijers | G10L 19/0212 704/203 |
| 2009/0190689 A1* | 7/2009 | Blu | G06F 17/10 375/285 |
| 2013/0136165 A1* | 5/2013 | Shirakata | H04L 27/265 375/226 |
| 2014/0075162 A1* | 3/2014 | Azadet | H04L 1/0054 712/221 |
| 2014/0086356 A1* | 3/2014 | Azadet | H04L 1/0054 375/295 |

OTHER PUBLICATIONS

Dragotti, P.L. et al.: "Sampling Moments and Reconstructing Signals of Finite Rate of Innovation: Shannon Meets Strang Fix", IEEE Transactions on Signal Processing, New York, NY, vol. 55, No. 5, (May 2007), pp. 1741-1757.

Hua, Y. et al.: "Matrix Pencil Method for Estimating Parameters of Exponentially Damped/Undamped Sinusoids in Noise", IEEE Transactions on Acoustics, Speech, and Signal Processing, vol. 38, No. 5, (May 1990), pp. 814-824.

Onativia, J. et al.: "Sequential Local Fri Sampling of Infinite Streams of Diracs", 2013 IEEE International Conference on Acoustics, Speech and Signal Processing (ICASSP); Vancouver, BC, (May 26, 2013), pp. 5440-5444.

Pan, H. et al.: "Sampling Curves With Finite Rate of Innovation", Proceedings of the 9th International Conference on Sampling Theory and Applications, Singapore, (May 2011), pp. 1-4.

Uriguen, J.A. et al.: "On the Exponential Reproducing Kernels for Sampling Signals With Finite Rate of Innovation", Proceedings of the $9^{th}$ International Workshop on SampTA, (May 2011), pp. 1-4).

Vetterli, M. et al.: "Sampling Signals With Finite Rate of Innovation", IEEE Transactions on Signal Processing, vol. 50, No. 6, (Jun. 2002), pp. 1417-1428.

Sun, Zhengwei, et al. "Channel Estimation for UWB System Based on Sampling with Finite Rate of Innovation." Modern Electronics Technique 17 (2009): 005. English Translation of Abstract Only.

Dragotti, Pier Luigi. "Sampling and Reconstruction driven by Sparsity Models: Theory and Applications." (2011).

Tur, Ronen, Yonina C. Eldar, and Zvi Friedman. "Innovation rate sampling of pulse streams with application to imaging." IEEE Transactions on Signal Processing 59.4 (2011): 1827-1842.

Chinese Office Action for corresponding Chinese Application No. 201480043658.9, dated Mar. 16, 2018, pp. 1-10.

Japanese Office Action for corresponding Japanese Application No. 2016-516250, dated Mar. 30, 2018, pp. 1-8.

\* cited by examiner

METHOD AND APPARATUS FOR ESTIMATING A FREQUENCY DOMAIN REPRESENTATION OF A SIGNAL

CROSS-REFERENCE TO RELATED APPLICATIONS

This application is a national phase application under 35 U.S.C. § 371 of International Application No. PCT/GB2014/051671 filed May 30, 2014, which claims priority to United Kingdom Application No. 1309689.6 filed May 30, 2013. The entire content of each of the above-referenced disclosures is specifically incorporated herein by reference.

The present invention relates to sampling and reconstruction of signals, and more particularly to the sampling and reconstruction of non-bandlimited signals, such as signals with a finite rate of innovation, FRI.

The fundamental problem of all sampling is to estimate an original signal from a discrete set of samples of that signal. Typically, the signal is distorted by the instrument which collects the measurement, for example by convolving the true signal with the sampling kernel of the instrument. In most signal processing, this distorted signal is then converted into discrete samples. It is well known that the signal domain spacing of the samples imposes a limit on the frequency domain bandwidth of the measurement.

Any particular signal collecting instrument has physical characteristics which effect the measurement performed by that instrument. These characteristics can distort the original signal before it is sampled. The nature of this distortion can be characterised by an instrument function. One example of such an instrument function is the point spread function of an optical system. This instrument function describes the distorting effect that the instrument has on the original signal before it is sampled.

There are typically two approaches to improving the accuracy of estimation of a signal based on samples of a measurement that signal. The first is to increase the sampling bandwidth (increase the sampling frequency). The second is to reduce the distorting effect of the instrument function, to take the example of an optical system, this could be done by reducing the spatial extent of the point spread function.

For certain classes of signal, such as signals with a finite rate of innovation, FRI, one theoretical approach to the problem of signal recovery assumes that the instrument function belongs to a class of functions known as exponential reproducing kernels. This class of functions is defined by the ability of each such kernel to reconstruct an arbitrary complex exponential function from a linear combination of shifted representations of that kernel.

In real practical instruments, the instrument function is determined by practical physical limitations of the instrument, for example in an optical system the aperture and other components in the optical train define the instrument function. Therefore, the instrument functions of real instruments generally are not exponential reproducing kernels. In addition, the theoretical approaches developed from FRI reconstruction using exponential reproducing kernels suffer from very poor stability in the presence of noise, e.g. deviations of the original signal from model behaviour. Of course, noise is inherent in any practical physical measurement. Therefore, although they have been known in the art for many years, these theoretical methods are not applicable to real world practical systems.

Aspects of the present disclosure are directed to the practical sampling, frequency space estimation, and recovery of, signals in practical real world systems, and in the presence of measurement noise. The signals may comprise FRI signals and other types of signal.

Embodiments of the present disclosure address this problem by modifying the discrete samples of a signal based on knowledge of the instrument function to provide a frequency domain estimate of that signal. In particular, the samples are scaled by a set of coefficients, Cmn. These coefficients are selected to fit a set of basis functions, hn, to a complex exponential function. Each of these basis functions is defined by a signal domain representation of the instrument function, shifted in the signal domain.

The versions of the instrument function are based on a characterisation of the instrument function in the frequency domain at selected frequencies, αm. These frequencies are also associated with the complex exponential function used to select the coefficients Cmn. The complex exponential function used to select the coefficients Cmn may comprise $\exp\{-\alpha_m t\}$, where t indicates a signal domain displacement. For example, in the case of a time domain function, the parameter t indicates a time delay, whilst, in the case of a spatial function, t, would indicate a spatial displacement rather than a time delay.

The frequencies αm may be complex frequencies, in the sense of Laplace transforms, where the imaginary part of the complex frequency indicates a frequency of an oscillatory component and the real part of the complex frequency indicates a damping or driving of the signal.

Embodiments of the disclosure relate to methods of configuring a signal processing apparatus 12 by selecting these frequencies and generating the corresponding coefficients Cmn for the instrument based on an estimate of an instrument function.

To assist in understanding the invention, a selection of particular implementations of the invention is discussed below. The first of these implementations relates to range finding based on the time of flight of a series of pulses. This example is chosen because it relates to the estimation of a signal comprising a sequence of pulses. As will be appreciated by the skilled addressee in the context of the present disclosure, most practical signals and a train of pulses in particular, may be described by the timing and amplitude of a series of single points (e.g. a train of Dirac-delta functions). Therefore, although this example is provided as one way of understanding the present disclosure, it will be understood that the apparatus and methods of the disclosure can be applied to signal processing of any signal.

The present disclosure finds particular application in FRI signals, but may also be applied to other types of signal. FRI signals, as the name implies have a finite number of degrees of freedom per unit time, and they may be either periodic or aperiodic. Examples of FRI signals include streams of Dirac delta functions, non-uniform splines, sinusoids, and piecewise polynomials.

Each of these types of signal may be characterised by their "innovation parameters". For example, the innovation parameters of a train of Dirac delta functions are the location, tk, in the signal domain (e.g. timing, or position) of the delta functions, and their amplitudes ak. This class of FRI signal is used as the basis of most of the discussion which follows, because nearly all signals can be reduced to a representation as a series of delta functions. It will however be appreciated that the teaching of the present disclosure is capable of application to any type of signal.

In an aspect there is provided a signal processing method for estimating a frequency domain representation (X) of signal (x) from a series of samples (yn) distorted by an instrument function, (h) the method comprising: obtaining the series of samples (yn); obtaining a set of coefficients (Cmn) that fit a set of basis functions (hn) to a complex exponential function wherein the set of basis functions comprises a plurality of basis functions, each defined by a shifted version of the instrument function, in a signal domain; estimating the frequency domain representation (X) of the signal (x) based on the series of samples (y) and the coefficients (Cmn); wherein the estimate of the instrument function is based on a characterisation of the instrument function in the frequency domain at frequencies associated with the complex exponential function.

In an aspect there is also provided a digital signal processing apparatus comprising: a data obtainer configured to obtain a series of samples, yn, of a signal, y(t), that corresponds to a signal x distorted by an instrument function, h; and a data scaler, configured to scale the series of samples, yn, using coefficients Cmn wherein the coefficients cmn are selected to approximate a complex exponential function from a set of basis functions, hn, defined by the instrument function shifted by a number of samples, n; a data provider for providing a frequency domain representation, X, of the signal, x, based on the scaled samples; wherein the instrument function is based on a characterisation of the instrument function in the frequency domain at frequencies associated with the complex exponential function.

The samples of the signal may be separated in the signal domain by an inter-sample interval, or sample period. Each basis function may be shifted in the signal domain with respect to the others by an integer number, n, of inter-sample intervals, in these examples, the fit can comprise a projection into the space defined by the basis functions. In some examples, each basis function may be shifted in the signal domain by a non-integer number of inter-sample intervals, and in these examples the fit can be performed by reducing a merit function.

The coefficients (cmn) may comprise a frequency domain representation, (Hn) of a respective corresponding one of the basis functions (hn). The complex exponential function may comprise signal domain oscillatory components, and the frequencies at which the instrument function (h) is characterised comprise the frequencies of the oscillatory components. The complex exponential function may consist solely of signal domain oscillatory components. This has been found to provide signal estimation that is particularly robust to noise.

In some possibilities the coefficients comprise the reciprocal of the frequency domain representation, Hn, of the basis functions hn at the selected frequencies. In some possibilities the coefficients comprise reversed versions of the frequency domain representation, Hn, of the basis functions hn. The coefficients may be scaled by the z-transform of the autocorrelation of the instrument function in the signal domain.

The selected frequencies may be evenly spaced in the frequency domain, and in some cases the frequencies are selected to reduce the variance in the magnitude of the instrument function at the frequencies whilst increasing the spacing between the frequencies. This has also been found to provide improved resilience to noise. In some possibilities, the signal has K degrees of freedom, where K is an integer, where K is an integer, n=0, 1, . . . , P, and P≤2K−1.

In some possibilities the signal to be estimated belongs to a class of finite rate innovation, FRI, signal, and the frequencies are selected based on the performance of a maximum likelihood estimator of innovation parameters of that class of signal. This may be achieved by reducing a Cramer-Rao bound.

In some possibilities the method comprises obtaining an error in the representation, provided by the coefficients (cmn) and the basis functions (hn), of the complex exponential function; and, based on this error, determining whether to re-estimate the frequency domain representation (X) of the signal. Determining whether to re-estimate the frequency domain representation (X) of the signal may comprise obtaining an estimate of noise in the original signal, and performing a comparison based on the estimated noise and the error in the representation of the complex exponential function.

In some possibilities, re-estimating the frequency domain representation of the signal comprises determining a filter configured to minimise the energy of the frequency domain estimation representation (X) of the signal (x), and adjusting the frequency domain representation based on the filter. This may be provided by an approximation to an annihilating filter. In some possibilities adjusting based on the filter comprises obtaining an estimate of parameters describing the location, in the signal domain, of the signal using the roots of the filter.

The annihilating filter method need not be used, for example in some possibilities re-estimating the frequency domain representation of the signal comprises obtaining an estimate of parameters describing the location, in the signal domain, of the signal by deriving eigenvalues from a matrix pencil problem.

In some possibilities the signal comprises an image, and the method further comprising scaling the frequency domain representation of the image based on the frequencies associated with the complex exponential function, determining a set of filter coefficients, bkj, configured to minimise the energy of the frequency domain representation of the image, and determining a boundary in the image from the filter coefficients. As will be appreciated, image data may be treated by estimating a frequency domain representation of each row, and then estimating the frequency domain representation of each column.

In some possibilities the image processing methods may be used for coregistration of images, in these possibilities the method comprises: determining a transform for coregistering the image with a second image based on the boundary, and based on a boundary obtained for the second image. There is also provided a method of enhancing image resolution, comprising identifying at least one boundary for each of a plurality of images, and determining, for each boundary, a transform for coregistering each boundary with a selected reference boundary, and determining a combined image based on the plurality of images and the transforms. Determining the combined image may comprise determining the value of pixels in the combined image based on samples from at least one of the images, and the transform associated with that image.

In an aspect there is provided a method of calibrating a signal acquisition device comprising a signal acquisition instrument, the method comprising: obtaining an estimate of the transfer function of the instrument; selecting a set of frequencies, that are evenly spaced in the frequency domain; and storing, in a memory of the device, coefficients (Cmn) based on samples of the transfer function at the selected frequencies. These frequencies may be selected to reduce the variance of the magnitude of the instrument function at the frequencies, whilst increasing the spacing between the frequencies. In some possibilities the signal acquisition device is adapted for acquiring finite rate innovation, FRI, signals, and the frequencies are selected based on the performance of a maximum likelihood estimator of innovation parameters of that class of signal.

The frequencies may be selected to reduce a Cramer-Rao bound determined based on those frequencies, as discussed in Annex 1.

Figure 1:
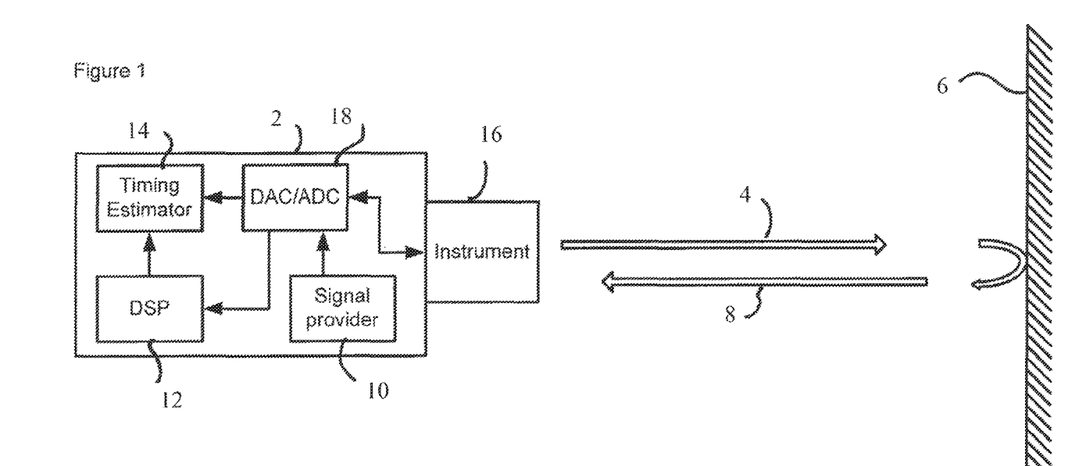
FIG. 1 shows a schematic diagram of a range finding apparatus comprising a signal processing apparatus.

Embodiments of the disclosure will now be described, by way of example only, with reference to the accompanying drawings, in which:

FIG. 1 shows a range finding apparatus 2 for determining a distance based on time of flight of a signal.

The range finding apparatus 2 is arranged to direct a signal 4 against an object 6, to receive the signal 8 reflected back from the object, and to determine the distance between the apparatus 2 and the object 6 based on the time delay between transmission of the outgoing signal 4 and receipt of the reflected signal 8 at the apparatus 2.

The range finding apparatus 2 comprises a signal provider 10 configured to transmit an outgoing signal 4 to the object 6. The signal provider 10 also provides the outgoing signal to a timing estimator.

The range finding apparatus 2 also comprises an instrument for detecting the reflected (incoming) signals. An ADC 18 is coupled to the detection instrument 16 for converting signals received by the instrument 16 into digital samples.

The ADC 18 is coupled to provide the samples of the received signals to a signal processing apparatus 12, DSP. The DSP 12 is configured to process the samples and to provide the processed samples to the timing estimator 14 configured to estimate the timing of the incoming reflected signal, and to determine the delay between the outgoing signal and the reflected signal. This enables the range finding apparatus to determine the distance to the object 6 based on the time of flight of the signal.

Figure 2:
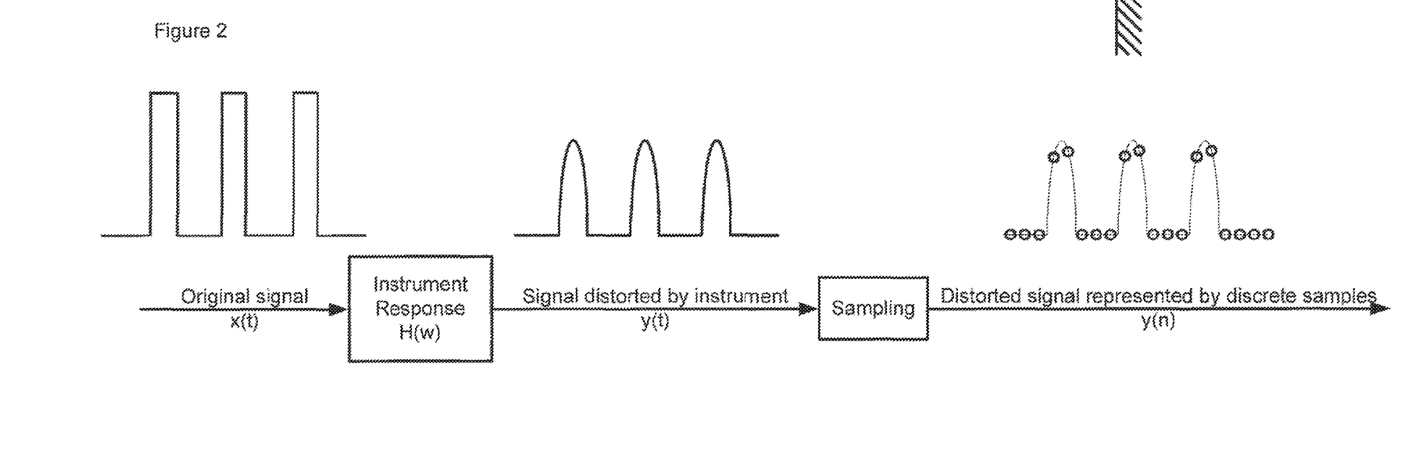
FIG. 2 illustrates the process of sampling a signal.

As illustrated in FIG. 2, the reflected signal 8 received by the instrument, comprises a time domain signal x(t). The detection instrument 16 distorts this incoming signal, for example by introducing delay, and attenuation. This distortion may be described by an instrument function, e.g. the impulse response of the instrument 16. The signal, x(t), distorted by the detection instrument, y(t), is then sampled by the ADC 18 to provide a discrete representation y(n) of the distorted signal.

In order to determine the distance between the range finding apparatus 2 and the object 8, the range finding apparatus 2 determines the delay between the transmission of the outgoing signal 4, and receipt of the reflected signal 6 based on this quantised representation of the signal, y(n). The resolution of this measurement is limited by the distortion introduced by the instrument function, and by the resolution of the ADC. Accordingly, the problem of range estimation in this context reduces to the fundamental problem of all sampling—mentioned above, e.g. how to recover an original signal from a discrete set of samples of that signal.

The example of range finding based on a series of pulses is useful for understanding the present disclosure, and it will be appreciated by the skilled addressee in the context of the present disclosure that many practical signals, including trains of pulses, may be expressed as a series of delta functions. Therefore, although this example is described in the context of range estimation, the principles can be applied to any signal, and in particular to signals which can be expressed as a series of delta functions.

Figure 3:
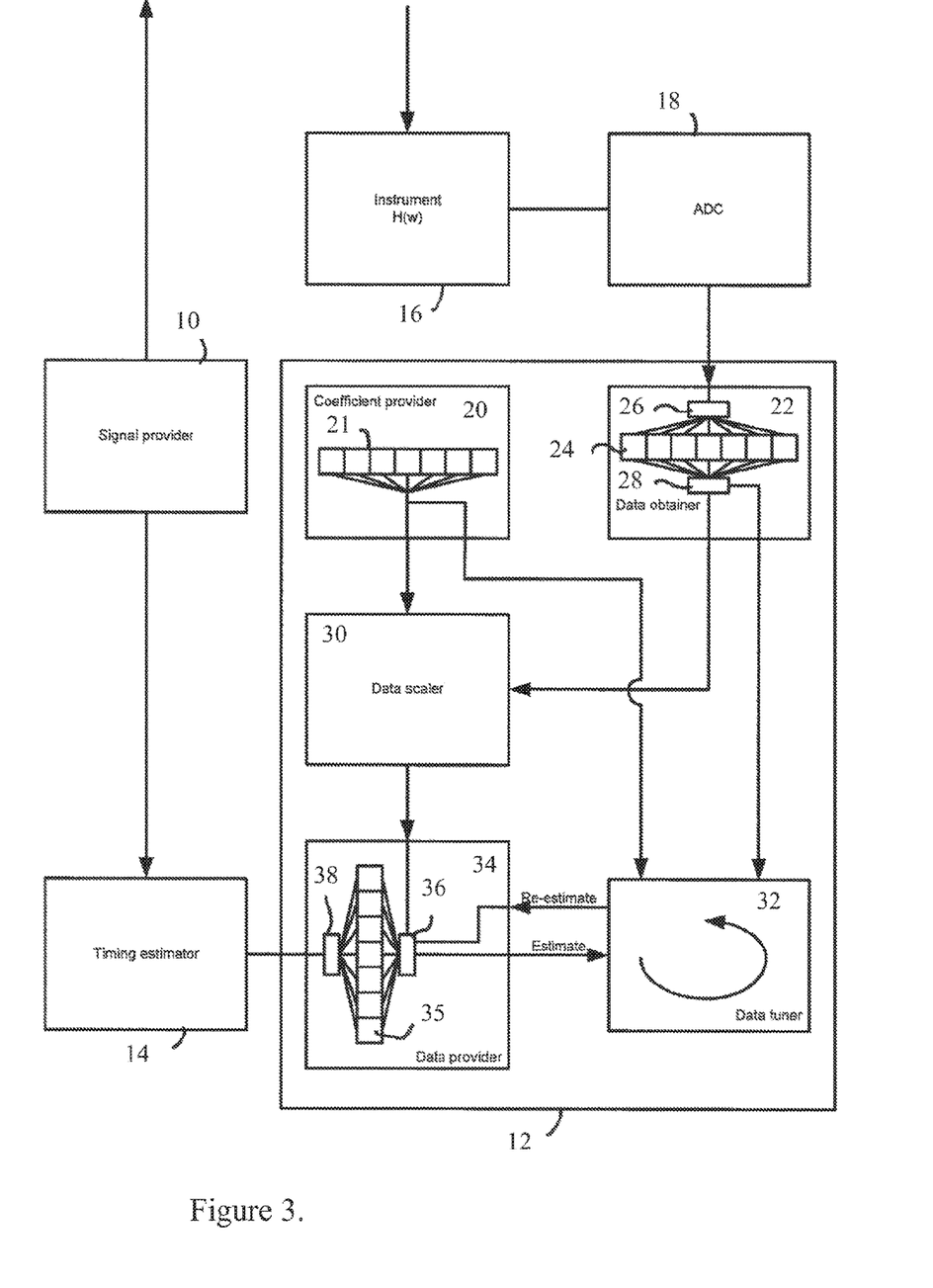
FIG. 3 shows a schematic diagram of a range finding apparatus which shows the signal processing apparatus 12 of FIG. 1 in more detail.

FIG. 3 illustrates a more detailed example of a range finding apparatus as described above with reference to FIG. 1 and FIG. 2. The apparatus shown in FIG. 3 comprises an instrument for obtaining a measurement of a signal, an ADC 18 for providing a series of samples of the measured signal, a signal processing apparatus 12, and a timing estimator.

The signal processing apparatus 12 is configured to receive the samples from the ADC, and to provide an estimate of a frequency domain representation of the signal measured by the instrument to the timing estimator. A signal domain representation of the signal can be derived from this frequency domain representation. Accordingly, the timing estimator 14 can estimate a time domain delay, between a transmitted signal and the signal domain representation based on the output from the signal processing apparatus.

The signal processing apparatus 12 may be provided separately from the remainder of the range finding apparatus of FIG. 3. The signal processing apparatus 12 and its methods of operation may be applied in other contexts. This signal processing apparatus 12 and its operation will now be described in greater detail.

The signal processing apparatus 12 comprises a data obtainer 22 for obtaining samples, y(n), of the signal from an ADC. The data obtainer 22 is coupled to a data scaler 30, and the data scaler 30 is coupled to a coefficient provider 20. The data scaler 30 is also coupled to a data provider 34 for providing an output from the signal processing apparatus. The signal processing apparatus 12 further comprises a data tuner 32 that is coupled to the data provider 34, to the coefficient provider 20, and to the data obtainer 22.

The data obtainer 22 comprises a memory 24 for storing signal samples, and an input interface 26 to enable data to be provided into the memory 24 from a source of digital samples such as the ADC 18. The data obtainer 22 also comprises a coupling 28 to enable the data scaler 30 and the data tuner 32 to read signal samples from the memory 24.

The coefficient provider 20 comprises a memory 21 configured to store coefficients, Cmn, and to provide these coefficients to the data scaler. The coefficients, Cmn, are selected to approximate a complex exponential function by defining a linear combination of a set of basis functions, e.g.

$$\sum_n C_{mn} h_n(t) \cong \exp\{\alpha_m t\} \qquad (1)$$

The basis functions hn(t) are defined by shifted versions of the instrument function in the signal domain, hn. Where n indicates a shift in the signal domain, e.g. by a number of sample periods, n, and the frequencies am may be complex frequencies where the imaginary part of the complex frequency indicates a frequency of an oscillatory component and the real part of the complex frequency indicates a damping or driving (decay or growth).

In the example illustrated in FIG. 3, the coefficient provider 20 comprises coefficients, Cmn, that are selected according to the relation:

$$C_{mn} = \frac{\exp\{\alpha_m n\}}{H(\alpha_m)} \quad (2)$$

Where $H(\alpha m)$ comprises the frequency domain version of the instrument function, hn, at the frequencies $\alpha m$. The frequencies, $\alpha m$, are selected to reduce the variance in the magnitude of the instrument function at those frequencies, $|H(\alpha_m)|$, whilst increasing the spacing between the frequencies. As noted above, the parameter, n, relates to a shift in the signal domain.

The data scaler 30 is configured to obtain the signal samples, y(n) via the data obtainer 22. The data scaler 30 is configured to scale these samples using the coefficients, Cmn, and to sum the scaled samples to estimate a frequency domain representation of the signal, $X(\alpha m)$, according to the relation:

$$X(\alpha_m) = \sum_n C_{mn} y_n \quad (3)$$

The data scaler 30 is configured to provide this estimate, $X(\alpha m)$, of the frequency domain representation of the signal to the data provider. For completeness at this stage, we note that it can be shown (see Annex 1) that this estimate $X(\alpha m)$ can be written as:

$$X(\alpha_m) = \sum_{k=0}^{K-1} x_k u_k^m - \zeta_m \quad (4)$$

Where:

$$u_k = \exp\left\{\lambda \frac{t_k}{T}\right\}, x_k = a_k \exp\left\{\alpha_0 \frac{t_k}{T}\right\},$$

in which ak and tk are the innovation parameters of the signal (e.g. the timing, tk, and amplitude, ak, of a train of delta functions representing the signal). $\zeta_m$ represents an error in the estimate as defined below. The parameters $\alpha 0$ and $\lambda$, are complex parameters which define the frequencies am in the complex plane according to the relation:

$$\alpha m = \alpha 0 + m\lambda,$$

where m is an integer $0 \leq m \leq 2K-1$, and K defines the number of degrees of freedom of the signal.

The data provider 34 comprises a memory 35 for storing data, and a coupling 36 to enable the data scaler 30 and the data tuner 32 to read and write data into the memory 35. The data provider 34 also comprises an output interface 38 to enable data to be provided as output, e.g. to the timing estimator.

The data tuner 32 is configured to obtain an estimate, E, of the measurement noise from the data obtainer, and to obtain the estimate $X(\alpha m)$ from the data provider. The data tuner 32 is also configured to estimate the error, $\zeta_m$, in the estimate $X(\alpha m)$ of the frequency domain representation of the signal according to the relation:

$$\zeta_m = \sum_{k=0}^{K-1} a_k \varepsilon_m \left(\frac{t_k}{T}\right) \quad (5)$$

Where the signal to be estimated may be considered as a series of K delta functions, tk represents the location of these delta functions in the signal domain (e.g. their timing) and ak represents their amplitudes. The amplitudes ak can be estimated from the frequency domain representation, $X(\alpha m)$, according to the relation defined in Equation 4, above (e.g. by setting $\zeta_m=0$ and solving Equation 4 above based on the current estimate of $X(\alpha m)$).

The parameter εm, in Equation 5 represents the mismatch between the exponential function $\exp\{\alpha m\}$ and a model assembled from shifted versions of the instrument function in the signal domain, hn(t), scaled by the coefficients, Cmn, viz:

$$\varepsilon_m(t) = \left|\exp\{\alpha_m t\} - \sum_n C_{mn} h_n(t)\right| \quad (6)$$

The data tuner 32 is configured to compare the estimate of the error, $\zeta_m$, with the estimate of the measurement noise, E, and to determine whether to re-estimate the signal based on this comparison.

If the signal is to be re-estimated, the data tuner 32 is operable to re-estimate the signal by determining a filter, F, that reduces the energy of the frequency domain estimation representation, $X(\alpha m)$, e.g. by selecting coefficients of the filter F that adjust the convolution integral F*X towards zero. This may be performed using a Matrix Pencil method as defined in Y. Hua and T. K. Sakar, "Matrix Pencil Method for Estimating Parameters of Exponentially Damped Undamped Sinusoids in Noise," IEEE Transactions on Acoustics, Speech and Signal Processing. vol. 38, pp. 814-824, May 1990, or by use of an annihilating filter approach as defined in M. Vetterli, P. Marliliano. and T. Blu. "Sampling signals with finite rate of innovation:" IEEE Transactions on Signal Processing, vol. 50, pp. 1417-1428, June 2002.

The data tuner 32 is configured to obtain the roots, uk, of the z-transform of the filter, F, (e.g. the points in the complex plane where the z-transform of F is zero valued), and to determine a new estimate of the timings, tk of the series of K delta functions based on the relation:

$$u_k = \exp\left\{\lambda \frac{t_k}{T}\right\} \quad (7)$$

Where T is the sampling period, and $\lambda$, represents the spacing of the frequencies am in the complex plane. The data tuner 32 is further configured to determine new estimates of the amplitudes, ak, based on the new estimate of the timings, tk.

The data tuner 32 is further configured to re-estimate the frequency domain representation of the signal by adjusting an existing estimate $X(\alpha m)$ based according to the relation:

$$X(\alpha_m)^{i+1} = X(\alpha_m)^i + \sum_{k=0}^{K-1} a_k^i \varepsilon_m\left(\frac{t_k}{T}\right) \quad (8)$$

Where the superscripts represent iteration number, e.g. $X(\alpha m)i+1$ represents the re-estimated frequency domain representation of the signal at the (i+1)th iteration, and $X(\alpha m)i$ represents the existing estimate at the ith iteration. The data tuner 32 is configured to repeat the process of determining the filter, F, and re-estimation of the frequency domain representation of the signal, X, until the parameters ak, tk converge. Convergence criteria can be selected based on the absolute or relative variation in the estimated parameters ak, tk between consecutive iterations, and/or based on an estimate of the measurement noise in the original signal (e.g. a determination as to whether the adjustment between iterations is less than the estimated measurement noise).

Figure 4:
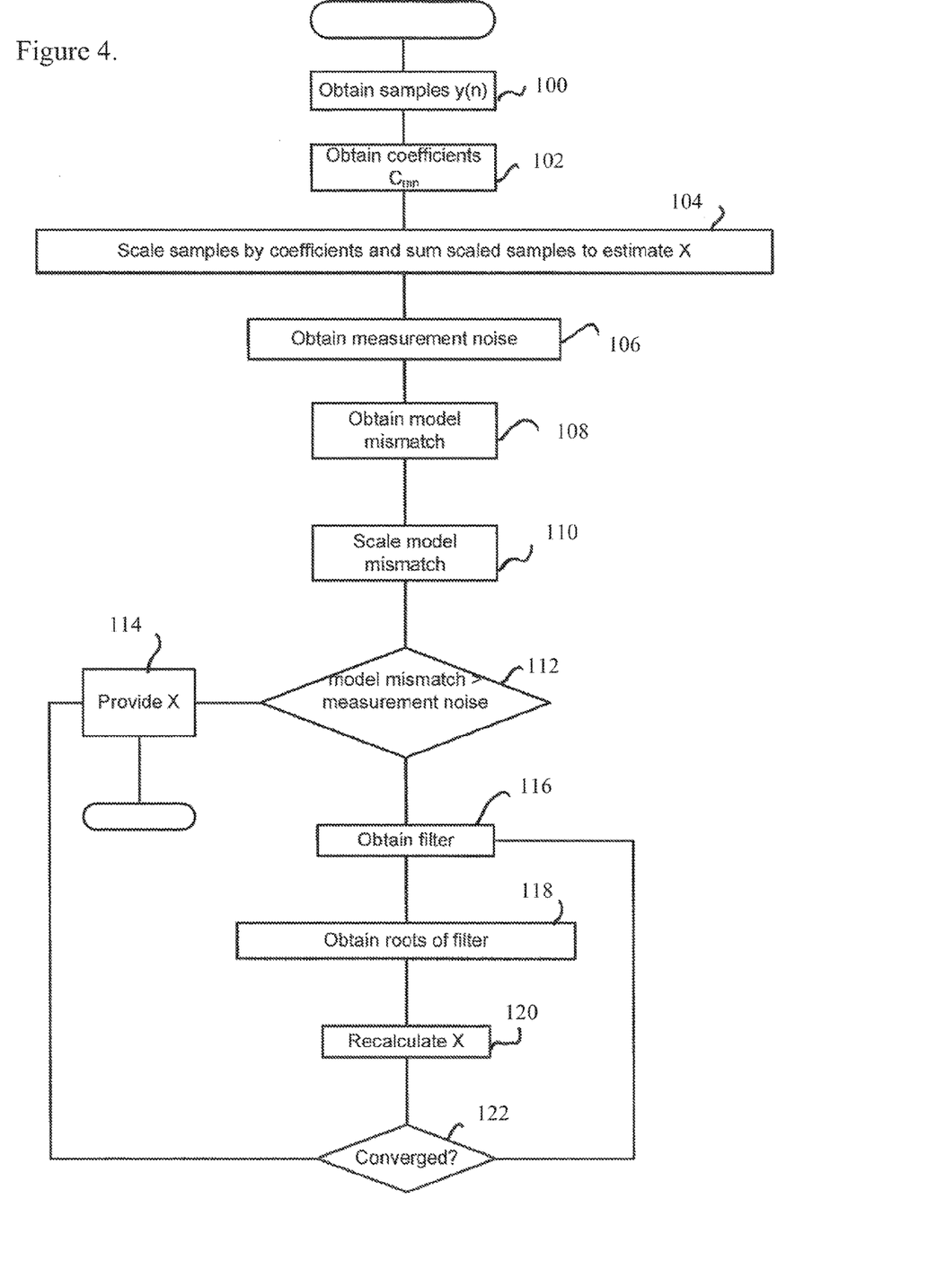
FIG. 4 illustrates one method of operation of a signal processing apparatus 12, such as that illustrated in FIG. 3.

Operation of the signal processing apparatus 12 will now be described with reference to FIG. 4.

In operation, the data scaler 30 obtains 100 a series of samples yn from the data obtainer 22 and obtains 102 the coefficients Cmn from the coefficient provider 20. The data scaler 30 scales 104 the samples using the coefficients to provide an estimate of the frequency domain representation of the signal as in Equation 3, above.

The data tuner 32 obtains 106 an estimate of the measurement noise in the original signal from the data obtainer. The data tuner 32 then scales 110 the model mismatch using the estimated amplitudes, ak, obtained from $X(\alpha m)$ according to the relation defined in Equation 5 to determine an estimate of the error $\zeta_m$ in the estimate of $X(\alpha m)$.

The data tuner 32 compares 112 the estimate measurement noise with an estimate of the error $\zeta_m$ as defined in Equation 5, above. In the event that the measurement noise is greater than the error associated with the model mismatch, the data tuner 32 does not tune the estimate and the data provider 34 provides 114 the estimate $X(\alpha m)$.

The data tuner 32 obtains 108 an estimate of a "model mismatch" based on the error in the representation of the complex exponential function, provided by the coefficients Cmn and the basis functions hn, as defined in Equation 6, above.

The data tuner 32 obtains the amplitudes ak by determining 116 a filter, F, that reduces the energy of the frequency domain estimation representation, X, e.g. by selecting coefficients of the filter F that adjust the convolution integral F*X towards zero. The data tuner 32 determines 118 the roots of the z-transform of this filter, uk (see Equation 7) which in turn yield the timings tk, and the amplitudes ak to re-estimate X. This may also be done using the Matrix Pencil approach as explained in Annex 1 and defined in Y. Hua and T. K. Sakar, "Matrix Pencil Method for Estimating Parameters of Exponentially Damped Undamped Sinusoids in Noise," IEEE Transactions on Acoustics, Speech and Signal Processing. vol. 38, pp. 814-824, May 1990.

The values of tk and ak are then tested 122 for convergence as described above with reference to FIG. 3. In the event that the values have converged, the data provider provides the estimate of the frequency domain representation of the signal, X. In the event that the values have not converged steps 116, 118, 120 and 122 are repeated.

This frequency domain estimate, $X(\alpha m)$, of the signal, x(t), may be used to estimate the signal x(t) in the signal domain, thereby enabling the timing estimator 14 to determine the time delay between the transmitted and reflected signals. This estimation may be performed by determining the eigenvalues of a Matrix Pencil problem to identify the innovation parameters, or by using an "annihilating" filter method, or an approximation thereto, or by any other application of Prony's method as defined in Annex 1.

As will be appreciated, although the example described so far has related to time domain signals, spatial signals, such as images may be treated in the same way. Just as trains of pulses can be characterised by the timing and amplitude of Dirac-delta functions, so images may be defined by the location and intensity of pixels, or the location, amplitude and gradient of image boundaries, and accordingly they may be treated as FRI signals. The signal processing apparatus 12 and method described with reference to FIG. 3 and FIG. 4 may also be applied to determining the innovation parameters of an image.

Figure 5:
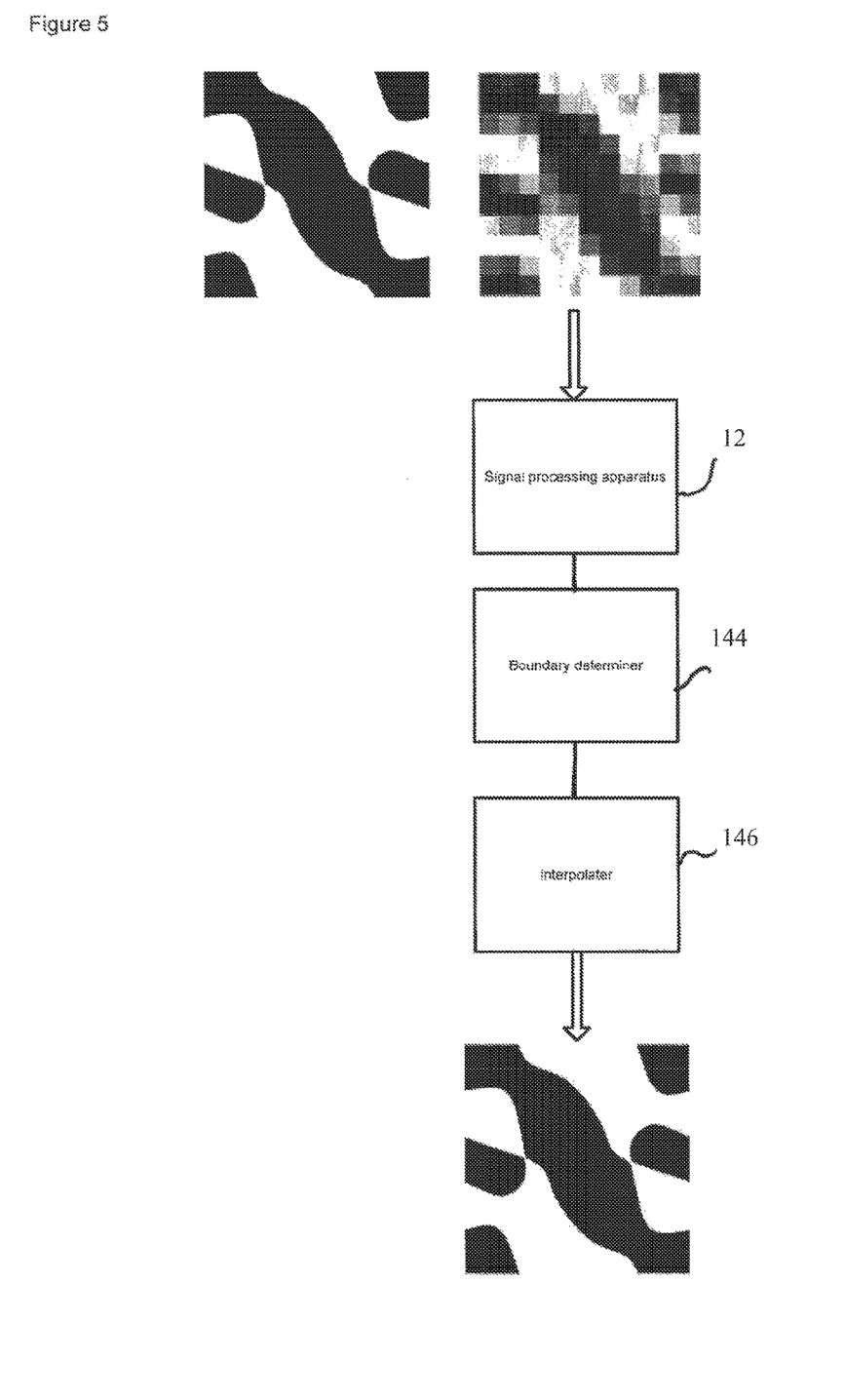
FIG. 5 illustrates an image processing method and apparatus that can be implemented using the signal processing apparatus 12 of FIG. 3 and/or the method illustrated in FIG. 4.

One particular example is illustrated in FIG. 5, and relates to defining a boundary between regions in a two-dimensional image.

FIG. 5 shows an example of an image processing apparatus. Also represented in FIG. 5 is original image, and a second version of the image as modified by an instrument function and by being sampled into pixels. In the example of FIG. 5, the pixel values of the second version of the image correspond to the samples, y(n), of the original signal.

The apparatus of FIG. 5 comprises a signal processing apparatus 12 as described above with reference to FIG. 3 and FIG. 4. The signal processing apparatus 12 is coupled to a boundary determiner, and the boundary determiner 144 is coupled to an interpolator.

The signal processing apparatus 12 is configured to receive the pixel values, and to operate on the pixel values according to the method described with reference to FIG. 4 to provide a frequency domain representation of the image. The frequency domain representation of the image, as with the example described in FIG. 3 and FIG. 4, is based on the frequencies $\alpha m$ at which the instrument function of the imaging has been characterised. Naturally, these may comprise horizontal and vertical components, so the frequency domain representation can be denoted $X(\alpha mx, \alpha my)$.

The boundary determiner 144 is configured to scale the values $X(\alpha mx, \alpha my)$ by the local frequency in the image to provide scaled frequency domain image data, I(x,y), as follows $$I(\alpha_{mx},\alpha_{my})=(\alpha_{mx}+j\alpha_{my})X(\alpha_{mx},\alpha_{my}), \quad (9)$$

Where, $$\alpha_{mx} = \frac{j2\pi xp}{M}, \alpha_{my} = \frac{j2\pi yq}{N},$$

j denotes the square root of minus one, M and N represent the dimensions of the image in the x and y directions respectively, and p and q are indices.

The boundary determiner 144 is further configured to determine a set of coefficients, b, that reduce the quantity I toward zero by solving, or finding an approximate solution (e.g. in a best fit sense) to the equations defined by:

$$b_{pq} * I_{pq} = 0 \quad (10)$$

where * indicates a convolution. This is analagous to finding the filter which annihilates the quantity I, and may be approached using the Annihilating Filter or Matrix Pencil methods as described above and in Annex 1. Once bpq has been determined, the boundary determiner 144 is configured to solve the system of equations:

$$f(x, y) = \sum_{p=1}^{K}\sum_{q=1}^{L} b_{pq}\exp\{-\alpha_{mx}\}\exp\{-\alpha_{my}\} = 0, \quad (11)$$

where, $$\alpha_{mx} = \frac{j2\pi xp}{M}, \alpha_{my} = \frac{j2\pi yq}{N},$$

to identify a boundary as the locations (x,y) in the image where f(x,y)=0.

In this system of equations M and N are the dimensions of the original image, and j denotes the square root of minus one. Verification of this result may be found in H. Pan, T. Blu, and P. L. Dragotti, 'Sampling Curves with Finite Rate of Innovation' in Proc. of Sampling Theory and Application Conference, Singapore, May 2011. This provides one particular way of identifying a boundary in an image. However, as will be appreciated, where an image comprises FRI signals, the innovation parameters of the image can be used to define the location of structures (such as boundaries) in that image, so other methods of recovering boundaries using the estimate X($\alpha$mx,$\alpha$my) may also be used, for example based on determining innovation parameters of the image.

The interpolator 146 is configured to obtain the boundary data from the boundary determiner, and to interpolate between the boundaries based on the samples of the image y(n). The interpolated image then incorporates the information obtained from the boundaries, and the initial image data values to provide an enhanced version of the image.

In addition to interpolating between boundaries to provide image enhancement, embodiments of the disclosure comprise methods of combining images to provide improved resolution. One such method is described with reference to FIG. 6 and FIG. 7.

Figure 6:
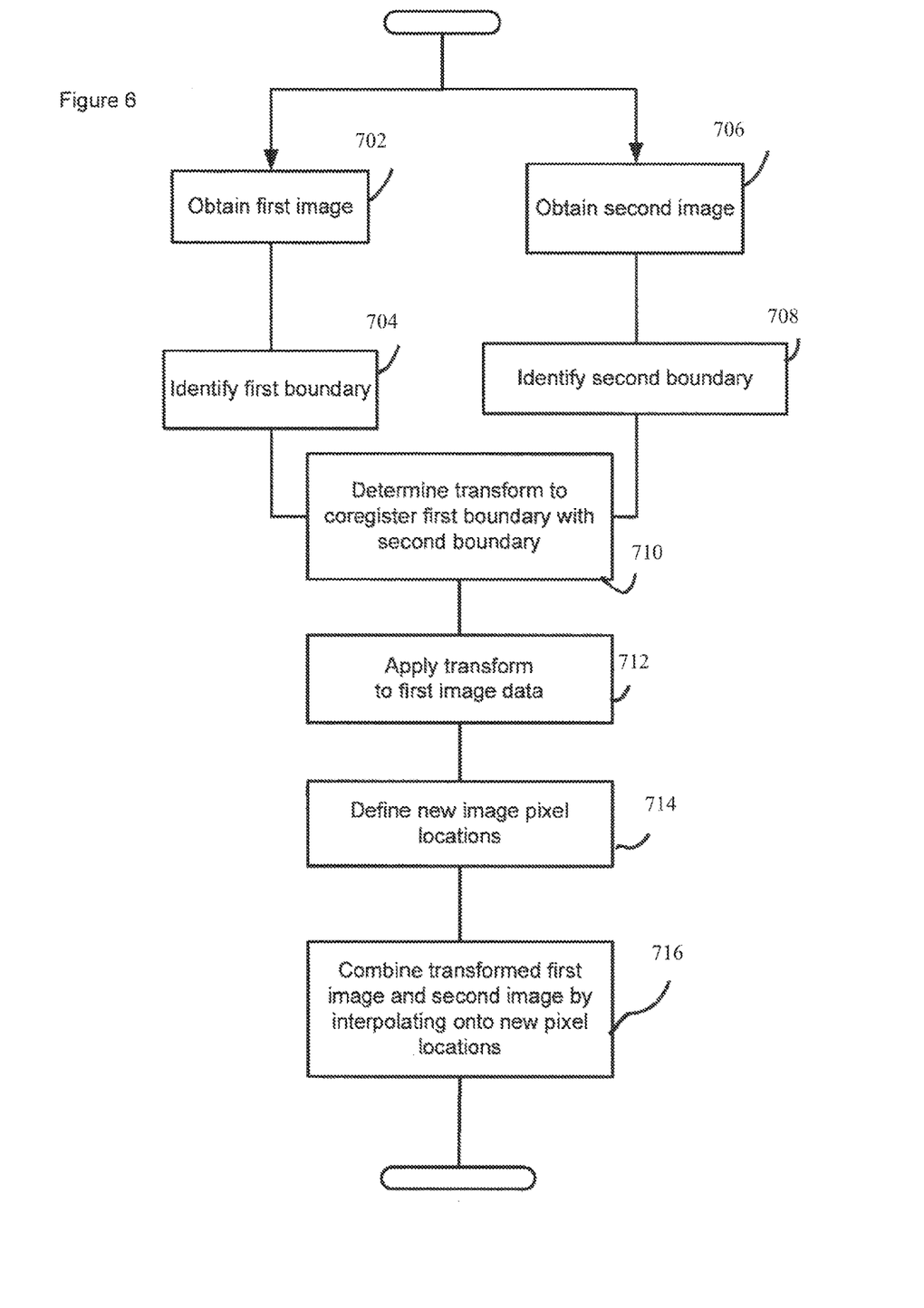
FIG. 6 illustrates a method of enhancing the resolution of an image.
Figure 7:
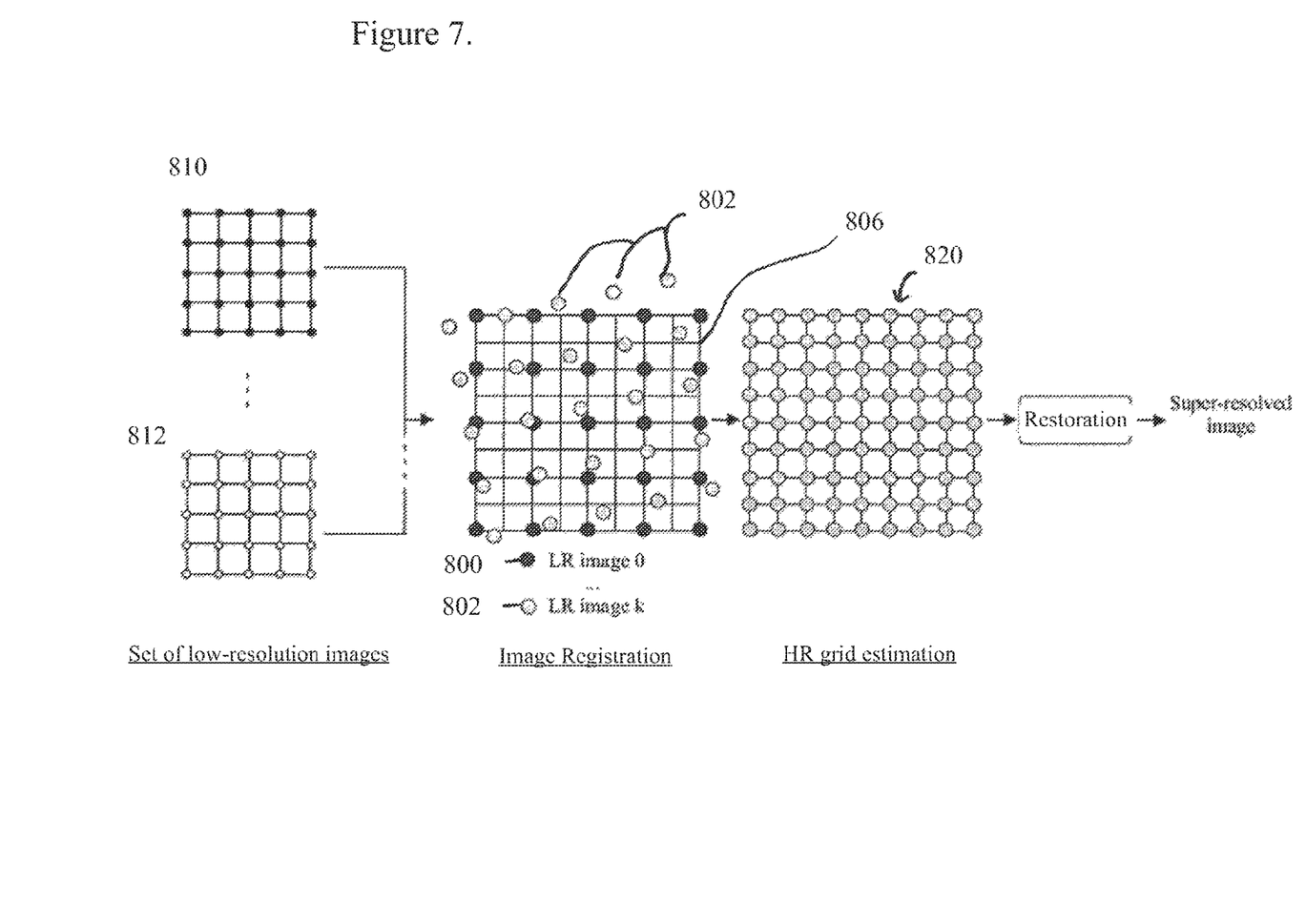
FIG. 7 further exemplifies the method illustrated in FIG. 6.

As illustrated in FIG. 6 and FIG. 7, in this method a first image 812 is obtained 702, and the frequency space representation of the image X1($\alpha$mx,$\alpha$my) estimated as described with reference to FIG. 3, FIG. 4, and FIG. 5. A first boundary is identified 704 in this first image 812 based on Equations 9 to 11, above A second image 810 is also obtained 706, the frequency space representation of this image X2($\alpha$mx,$\alpha$my) is estimated, and a second boundary is identified 708 in this second image. This can be done in the same way as the first image but as will be appreciated the first and second boundaries need not be obtained in the same way, nor at the same time.

A transform, such as an affine transform, is determined 710 for co-registering the first boundary with the second boundary. This may, for example, be performed by finding a transform that reduces (e.g. minimises) a merit function based on the difference between the two boundaries.

A set of image pixel locations 806 is then determined 714 from the transform, to provide a set of pixel locations 806 having a resolution higher than the first image 812 and the second image 810. The transform is then applied to the first image data 812 to provide transformed first image data 802.

The transformed first image data 802, and the second image data 810 are then combined 716 by interpolating from the transformed first image data 802, and the second image data 810 to determine combined image data 820 at the new set of pixel locations 806.

Naturally, although this method has been described with reference to the co-registration of two images, it may be applied to any number of images.

To assist in understanding the disclosure, the functionality of the signal processing apparatus 12 of FIG. 2 has been notionally subdivided into functional elements. It will however be appreciated that these functional elements need not be provided as physically distinct structures, and some or all aspects of the functionality may be provided in a common physical structure, and some or all aspects of the functionality may be further subdivided. As one particular example, the signal processing apparatus 12 may be provided by a single processor, and the data provider 34 and the data obtainer 22 may comprise memory elements, such as registers or buffers that are readable and/or writable by the chip. For example the data provider 34 and the data obtainer 22 may be memory caches, such as on-chip caches of the processor. In addition, this functionality may be provided by any appropriate processor such as an application specific integrated circuit, ASIC, a field programmable gate array, FPGA, or an assembly of digital logic gates. In some embodiments the functionality is provided by a computer program. The computer program comprises program instructions operable to program a processor to provide the functionality of the signal processing apparatus. This computer program can be stored in a transitory or non-transitory form.

FIG. 1 introduces one example of how an embodiment of the disclosure may be used. This particular example relates to range finding, and this example is chosen because it relates to the estimation of a signal comprising a sequence of pulses. As will be appreciated by the skilled addressee in the context of the present disclosure, any signal may be described by a series of single points (e.g. a train of Dirac delta functions). Therefore, although this example is provided as one way of understanding the present disclosure, it will be understood that the apparatus and methods of the disclosure can be applied to signal processing in many other circumstances. Estimating a train of pulses is just one example. Examples of instrument functions include the impulse response of a filter, and the point spread function of an optical system.

A variety of signals could be used in the range finding example of FIG. 1, such as optical or acoustic (e.g. ultrasound) signals. However, as will be appreciated in the context of the present disclosure, the temporal resolution of the ADC, and the speed of the outgoing and reflected signals (e.g. the speed of light for optical signals), limit the accuracy of the measurement.

The instrument function may be characterised by its response to a unit impulse, another way is to measure the response of the instrument to signals of known frequency and amplitude, for example using sinusoids of known frequencies. Other methods of characterising detection instruments will be apparent to the skilled addressee in the context of the present disclosure.

In the discussion above, the parameter n is used to index samples in the signal domain, and is used to denote shifts in the signal domain example, where the signal is a time domain signal, the parameter n relates to a time delay, and where the signal is a spatially varying signal, the parameter n relates to a spatial displacement.

The delays, n, may comprise integer numbers of samples, in which case the coefficients Cmn may be obtained from an orthogonal projection of the exponential function exp{$\alpha$m} onto the shifted basis functions. However, in some embodiments the delays, n, may comprise integer and non-integer numbers of samples. In these possibilities the coefficients Cmn can be obtained from fitting procedure based on a reduction of a merit function that describes the model mismatch, such as:

$$\varepsilon_m(t) = \left| \exp\{\alpha_m t\} - \sum_n C_{mn} h_n(t) \right|$$

One way to select these coefficients, Cmn, is according to the relation defined in Equation 2 above. However, other numerical and analytical solutions may be used. For example:

$$C_{mn} = \frac{H(-\alpha_m)}{\hat{a}_H(\exp\{\alpha_m\})} \exp\{\alpha_m n\},$$

Where $$\hat{a}_H(\exp\{\alpha_m\}) = \sum_{l \in Z} a_H[l] \exp\{-\alpha_m l\}$$

is the z-transform of the auto-correlation of the signal domain representation of the instrument function $a_H = \langle h(t-l), h(t) \rangle$ evaluated at $z = \exp\{\alpha m\}$.

The coefficients Cmn may be selected in other ways. For example, coefficients may be selected based on constraining the model mismatch to have particular values (e.g. to be zero to within a selected tolerance) at particular locations. One example of this approach is to ensure that the model $\Sigma C_{mn} h_n$ interpolates the exponential function $\exp\{\alpha m t\}$ exactly where t is an integer. Taking this approach, the coefficients can be defined:

$$C_{mn} = \frac{1}{\sum_{l \in Z} \exp\{\alpha_m l\} h(l)} \exp\{\alpha_m n\}$$

Other coefficients which reduce a merit function determined by the model mismatch may also be used. Examples of these coefficients typically comprise frequency domain representations of the instrument function.

The frequencies, am, are described as being selected to reduce the variance in the magnitude of the instrument function at these frequencies, H(αm) whilst increasing the spacing between the frequencies. This may be achieved in a variety of ways. In some embodiments, the signal belongs to a class of finite rate innovation, FRI, signal, and the frequencies, am are selected based on the performance of a maximum likelihood estimator of innovation parameters of that class of signal. One way to achieve this is by selecting the frequencies, am, that reduce (for example minimise) the Cramer-Rao bound, which is defined by Equation 16 of Annex 1. Other approaches may be used to select these frequencies. One or more sets of coefficients Cmn can be stored by the coefficient provider 20. In addition, the model mismatch $\varepsilon_m(t)$ may also be stored in a memory, for example for access by the data tuner.

In the range finding example, the original signal is a time domain signal, and so references to frequency domain and signal domain should be understood in this context. Other examples relate to image processing, in which case the signal is a spatial domain signal, and so references to signal domain and frequency domain should be understood in that context. As will be appreciated by the skilled reader in the context of the present disclosure the link between the frequency domain and the signal domain may be provided by any one of a selection of transforms such as Fourier series, Fourier transforms, Laplace transforms, Z-transforms or any other frequency transform.

In particular the signal processing methods and apparatus of the disclosure may be used in the estimation of neurological signals, or in seismology, or image processing. Examples of the disclosure provide multi-channel data acquisition apparatus, where each channel comprises a signal processing apparatus 12 such as that described with reference to FIG. 3.

It will be appreciated that a signal processing method for estimating a frequency domain representation of a signal from a series of samples of the signal collected by an instrument and distorted by an instrument function associated with the collection of the signal by the instrument has been disclosed. It will also be appreciated that this method may be applied in any one of the various ways described herein. For example the method may comprise: obtaining the series of samples; obtaining a set of coefficients that fit a set of basis functions to a complex exponential function wherein the set of basis functions comprises a plurality of basis functions each defined by a shifted version of the instrument function in a signal domain; estimating the frequency domain representation of the signal based on the series of samples and the coefficients; wherein the instrument function is based on a characterisation of the instrument function in the frequency domain at frequencies associated with the complex exponential function. Each of these features of this method may be implemented, generalised, or further refined in any one or more of the ways described herein.

It will therefore be understood that the embodiments described are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented using controllers and/or processors which may be provided by fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software, code, electronic instructions, flash memory, optical disks, CD-ROMs, DVD ROMs, magnetic or optical cards, other types of machine-readable mediums suitable for storing electronic instructions, or any suitable combination thereof.

Further details concerning the systems and methods disclosed herein can be found in United States Published Patent Application No. US 2016/0119007 A1, published Apr. 28, 2016, which is hereby incorporated by reference.

The invention claimed is:

1. A digital signal processing method for estimating a frequency domain representation of a signal, the method comprising:
    obtaining, by a processor, signal sample data comprising a series of samples, wherein the samples comprise samples of a physical signal collected by a signal measurement instrument and the series of samples is distorted by an instrument function associated with the collection of the physical signal by the signal measurement instrument;
    obtaining, by the processor, coefficient data comprising a set of coefficients that fit a set of basis functions to a complex exponential function wherein the set of basis functions comprises a plurality of basis functions each defined by a shifted version of the instrument function in a signal domain;
    calculating, by the processor, estimates of the frequency domain representation of the signal by scaling each item of signal sample data by a corresponding item of the coefficient data and summing the scaled sample data to convert the samples of the signal into an estimate of the frequency domain representation of the signal;
    wherein the estimate of the instrument function is based on a characterisation of the instrument function in the frequency domain at frequencies associated with the complex exponential function.

2. The method of claim 1 in which the samples are separated in the signal domain by an inter-sample interval, and each basis function is shifted in the signal domain by an integer number of inter-sample intervals, and the fit comprises a projection into the space defined by the basis functions.

3. The method of claim 1 in which the samples are separated in the signal domain by an inter-sample interval, and each basis function is shifted in the signal domain by a non-integer number of inter-sample intervals, and the fit is performed by reducing a merit function.

4. The method of claim 1 wherein the coefficients comprise a frequency domain representation of a respective corresponding one of the basis functions.

5. The signal processing method of claim 1 in which the complex exponential function comprises signal domain oscillatory components, and the frequencies at which the instrument function is characterised comprise the frequencies of the oscillatory components, and in which the frequencies are evenly spaced in the frequency domain.

6. The signal processing method of claim 5, in which the frequencies are selected to reduce the variance in the magnitude of the instrument function at the frequencies whilst increasing the spacing between the frequencies, and in which the signal belongs to a class of finite rate innovation, FRI, signal, and the frequencies are selected based on the performance of a maximum likelihood estimator of innovation parameters of that class of signal.

7. The signal processing method of claim 1 further comprising providing an estimate of the signal, based on the frequency domain representation.

8. The signal processing method of claim 1 comprising:
    obtaining an error in the representation provided by the coefficients and the basis functions of the complex exponential function;
    and, based on this error, determining whether to re-estimate the frequency domain representation of the signal.

9. The signal processing method of claim 8, in which determining whether to re-estimate the frequency domain representation of the signal comprises obtaining an estimate of noise in the original signal, and performing a comparison based on the estimated noise and the error in the representation of the complex exponential function.

10. The signal processing method of claim 8 in which reestimating the frequency domain representation of the signal comprises determining a filter configured to minimise the energy of the frequency domain estimation representation of the signal, and adjusting the frequency domain representation based on the filter; and in which adjusting based on the filter comprises obtaining an estimate of parameters describing the location, in the signal domain, of the signal using the roots of the filter.

11. The signal processing method of claim 8 in which reestimating the frequency domain representation of the signal comprises obtaining an estimate of parameters describing the location, in the signal domain, of the signal by deriving eigenvalues from a matrix pencil problem.

12. The method of claim 1, in which the signal comprises an image, and further comprising scaling the frequency domain representation of the image based on the frequencies associated with the complex exponential function, determining a set of filter coefficients, $b_{kj}$, configured to minimise the energy of the frequency domain representation of the image, and determining a boundary in the image from the filter coefficients.

13. An image coregistration method comprising the method of claim 12, comprising:
    determining a transform for coregistering the image with a second image based on the boundary and based on a boundary obtained for the second image.

14. A method of enhancing image resolution, comprising identifying, according to the method of claim 12, at least one boundary for each of a plurality of images, and determining, for each boundary, a transform for coregistering each boundary with a selected reference boundary, and determining a combined image based on the plurality of images and the transforms.

15. The method of claim 14 in which determining the combined image determining the value of pixels in the combined image based on samples from at least one of the images, and the transform associated with that image.

16. A digital signal processing apparatus comprising:
    a data obtainer configured to obtain sample data comprising a series of samples of a signal collected by a signal measurement instrument, wherein the series of samples corresponds to a signal distorted by an instrument function associated with the collection of the signal by the instrument, and a data scaler, configured to scale each of the items of sample data the series of samples, using a corresponding one of a plurality of coefficients wherein the plurality of coefficients are each selected to approximate a complex exponential function from a set of basis functions, defined by the instrument function shifted by a number of samples;

a data provider for providing a frequency domain representation, of the signal, based on the sum of the scaled samples;

wherein the instrument function is based on a characterisation of the instrument function in the frequency domain at frequencies associated with the complex exponential function.

17. The method of claim 1 comprising providing the calculated estimate of the frequency domain representation to provide measurement of a physical signal.

18. The method of claim 17 further comprising operating the signal measurement instrument to collect the samples.

* * * * *